United States Patent Office 2,789,968
Patented Apr. 23, 1957

2,789,968

POLYCARBONATES FROM POLYMETHYLENE GLYCOL-BIS-(ALKYL OR ARYL CARBONATES)

Delbert D. Reynolds and John Van Den Berghe, Rochester, N. Y., assignors to Eastman Kodak Company, Rochester, N. Y., a corporation of New Jersey No Drawing. Application December 8, 1953,
Serial No. 397,035

9 Claims. (Cl. 260—77.5)

This invention relates to highly polymeric linear polycarbonates prepared by the self-condensation of a bis-(alkyl or aryl carbonate) diester of a dihydroxy aliphatic hydrocarbon in the presence of an ester-interchange catalyst.

This invention also includes highly polymeric linear polycarbonates prepared by condensing mixtures of bis-(alkyl or aryl carbonate) diesters of such dihydroxy organic compounds.

This invention furthermore relates to a process for preparing these highly polymeric linear polyesters by the self-condensation of a bis-(alkyl or aryl carbonate) diester of a dihydroxy aliphatic hydrocarbon, which compounds are hereinafter called bis-(carbonate) monomers, said process being characterized by an ester-interchange reaction whereby an alkyl or an aryl carbonate is removed by vaporization.

It is an object of this invention to provide unexpectedly superior highly polymeric linear polycarbonates as described herein. An additional object of this invention is to provide a process for the preparation of these polycarbonates. Other objects will become apparent hereinafter.

Linear polycarbonates prepared by the condensation of a glycol with an alkyl carbonate have been described by Carothers and his followers in a few patents and in Carothers' collected papers. Practically no subsequent work appears to have been performed in connection with the preparation of highly polymeric linear polycarbonates. The materials prepared as described in Carothers' collected papers were of relatively low molecular weight and do not constitute highly polymeric linear crystalline polycarbonates which are useful as waxes, plasticizers, etc., and which possess an unexpectedly high intrinsic viscosity such that they can be extruded to form films and the like which can be mechanically worked and heat set to form molecularly oriented structures. According to Carothers, all of the polycarbonates described were prepared by alcoholysis between a glycol and ethyl carbonate in the presence of an alkaline catalyst such as sodium whereby vapors of an alcohol were driven off by heating. One of Carothers' followers suggests that a trace of an aliphatic dibasic acid can be introduced into the reactants in Carothers' process whereby "superpolycarbonates" can be produced by heating under a vacuum. Products having intrinsic viscosities up to as high as 0.57 in chloroform are described. The prior art does not describe any completely satisfactory procedure which will produce linear highly polymeric polycarbonates having intrinsic viscosities of at least 0.7 in chloroform. In contrast, the process of the instant invention is simple, direct, easily reproducible, and the polycarbonates obtainable have exceptionally high intrinsic viscosities.

There are other regards in which the polycarbonates of this invention are superior to those described in the prior art in their physical characteristics. These include the percentage of elongation, tenacity, elastic recovery, work recovery, stress-relaxation, tensile strength, resistance of films to tearing and to repeated folding, modulus of elasticity, electrical properties, etc.

We have therefore discovered polycarbonates which upon initial examination might appear somewhat related to those previously described but upon more careful examination are found to be entirely new and distinct in regard to their inherent nature and their utility whereby products which could not feasibly be prepared from the products of the prior art are now made possible.

The process of this invention for producing the novel polycarbonates comprises (A) self-condensing a bis-(carbonate) monomer having the following formula:

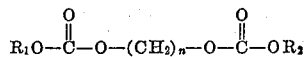

wherein $R_1$ and $R_2$ each represents a radical selected from the class consisting of lower alkyl radicals containing from 1 to 4 carbon atoms and aryl radicals of the benzene series containing from 6 to 8 carbon atoms and $n$ represents a positive integer of from 4 to 10, (B) in the presence of an ester interchange catalyst as a condensing agent, (C) at an elevated temperature, (D) the condensation being conducted in an inert atmosphere, and (E) the latter part of the condensation being conducted at a very low pressure.

It can readily be seen from the description of this process that there is no problem involved in adjusting the ratio of carbonate constituents to the dihydroxy aliphatic hydrocarbon constituents in the reaction vessel since the polycarbonates are produced according to this invention by the self-condensation of only one starting material. This establishes the composition of the polycarbonate produced since there can be no variation in the proportion of carbonate and dihydroxy compound constituents. Moreover, the nature of this process makes it admirably suited to conducting the process on a continuous basis since no problems are involved in maintaining critical proportions of reactants.

Examples of the starting materials, i. e. the bis-(carbonate) monomers which can be used in the process of this invention include hexamethylene glycol-bis-(ethyl carbonate), tetramethylene glycol-bis-(ethyl carbonate), decamethylene glycol-bis-(p-tolyl carbonate), octamethylene glycol-bis-(phenyl carbonate), pentamethylene glycol-bis-(n-butyl carbonate), heptamethylene glycol-bis-(isopropyl carbonate), etc.

In carrying out the process of this invention the ester-interchange catalysts which can be employed as condensing agents include the following compounds: alkali metals, the alkaline earth metals, the oxides of these two groups of metals, the alkoxides containing from 1 to 8 carbon atoms of these two metals, the carbonates and borates of these two metals, lead oxide, compounds of germanium, antimony, cobalt and other metals including compounds having the following formulas:

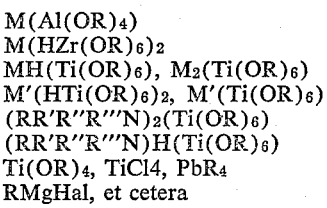

wherein M represents an alkali metal, M' represents an alkaline earth metal selected from the group consisting of magnesium, calcium and strontium, R represents an alkyl group containing from 1 to 6 carbon atoms, R', R" and R'" each represents a member of the group consisting of R and an aryl group of the benzene series containing from 6 to 9 carbon atoms and Hal represents a halogen atom.

The ester interchange catalytic condensing agents which have been described above can be advantageously employed in an amount of from 0.005% to about 0.2% by weight of these catalysts based upon the weight of the starting material being condensed. Higher or lower percentages can also be employed. Generally, from about 0.01% to about 0.1% of at least one of these ester-interchange catalysts is particularly advantageous. Many of these ester-interchange catalytic condensing agents are described in the prior art relating to the preparation of polyesters. There are numerous literature and patent references describing such catalysts. Some of the valuable ester-interchange catalytic condensing agents are described in a series of copending applications filed on October 3, 1952, by one or more of Caldwell, Wellman, and Reynolds, Serial No. 313,072, now Patent No. 2,720,502; Ser. No. 313,073, now Patent No. 2,720,503; Ser. No. 313,074, now Patent No. 2,720,504; Ser. No. 313,075, now Patent No. 2,727,881; Ser. No. 313,076, now Patent No. 2,720,505; Ser. No. 313,077, now Patent No. 2,720,506; Serial No. 313,078, now Patent No. 2,720,507, inclusive.

The temperatures at which the condensation can be conducted are advantageously increased during the course of the condensation. Advantageously, the condensation reaction can be considered as being conducted in two stages. The temperature to which the condensation reaction mixture is initially raised at the beginning of the first stage is advantageously in excess of about 200° C. Lower temperatures can also be employed. It is convenient to consider the condensation process as being conducted in two separate stages although the actual condensation itself continues smoothly from the first stage into the second stage. The principal distinction between the so-called two stages lies in the fact that during the latter stage the pressure of the adjacent atmosphere under which the condensation is performed is greatly reduced. Although the temperature can remain the same for both the first and the second stage, it may be advantageous to employ a somewhat higher temperature at about the same time as the pressure is reduced. Temperatures employed during the latter part of the second stage can advantageously be as high as 240°–250° C. or higher, with the maximum temperature being determined by the tendency of the polycarbonate to decompose at extremely high temperatures.

The reduced pressure which is employed during the second stage of the condensation is advantageously less than about 15 mm. of Hg pressure. Most advantageously the pressure is less than about 0.5 mm. of Hg pressure. Generally speaking, pressures are employed which are the lowest pressures obtainable by the employment of an efficient high vacuum mechanical pump. Such pressures generally are in the range of less than 1 mm. of Hg pressure.

The inert atmospheres which can be advantageously employed in the course of the condensation reaction include atmospheres of nitrogen, hydrogen, helium, carbon dioxide, etc.

It is generally advantageous to stir the condensing reaction mixture in order to maintain a reasonably even distribution of temperature throughout the reaction mixture and to otherwise facilitate the condensation. However, this is not essential especially when small quantities of bis-(carbonate) monomers are being condensed. During the course of the reaction an alkyl or an aryl carbonic acid ester will be evolved as a gas as indicated hereinabove. Stirring facilitates the removal of this material in its gaseous form. Either as an aid to the stirring operation or in lieu thereof, the inert gas can be advantageously bubbled through the reaction mixture whereby the removal of the carbonic acid ester is facilitated.

The products of this invention are linear highly polymeric polycarbonates having intrinsic viscosities in chloroform of at least 0.7, which are composed of the following repeating units:

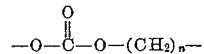

wherein the units are connected by ester linkages and $n$ represents a positive integer of from 4 to 10.

The various conditions described somewhat generally hereinabove can obviously be varied considerably to suit the particular starting material being condensed as more particularly set forth in the examples below.

It is well known that variations in the number of carbon atoms in the connecting chains between ester residues in polyesters has an effect upon the melting points and crystalline structure of the polyester obtained. Polycarbonates exhibit similar characteristics since they are analogous to polyesters. In fact, carbonic acid has sometimes been considered as the first member of the series of dibasic aliphatic acids which continues with oxalic acid, malonic acid, etc. On the other hand, carbonic acid does not possess two carboxy radicals and has many peculiar properties which clearly distinguish it from the ordinary aliphatic dibasic acids such as succinic acid, etc. In many instances polycarbonates possess sufficiently high melting points to be valuable for the preparation of valuable polymeric products, especially if they are modified as described elsewhere in regard to the preparation of interpolycarbonates, see copending applications filed on even date herewith, i. e., Serial No. 407,804, Serial No. 407,805, and Serial No. 407,806. Besides employing bis-(carbonate) monomers in the formation of interpolycarbonates, the polycarbonates of this invention can be mechanically admixed with other polycarbonates to form mixed polymers possessing average properties derived from the various components of the mixture. It is similarly obvious that both the unmodified polycarbonates and the interpolycarbonates can be suitably blended or mixed with other high polymers such as polyesters, polyurethanes, polyamides, polystyrene, polyethylene, etc., insofar as the polycarbonates of this invention are compatible with such high polymers. The products which can be produced include waxes, fibers, films, sheets, molded articles, extrusion products, etc.

As regards continuous processes for carrying out the preparation of the polycarbonates of this invention, it is obvious that many types of apparatus known to be useful in conducting various related continuous processes could be adapted for the preparation of these polycarbonates. For example, a suitable elongated cylindrical reaction vessel (either upright or mounted at an angle) can be employed whereby the first stage of the reaction can be performed by introducing the starting material into the top of the reaction vessel to form an initial charge. The reaction vessel employed can be advantageously provided with a stirring device, a gas inlet and a heating means. The introduced bis-(carbonate) monomer can then be mixed with an ester-interchange catalyst and stirring can be begun while heat is applied. An inert gas such as hydrogen can be introduced into the reaction vessel so as to bubble through the mixture or such a gas can merely be maintained as an atmosphere above the mixture. When a sufficient period of time has elapsed to complete the first stage of the condensation reaction, some of the condensed reaction mixture can be withdrawn through a valve in the bottom of the reaction vessel and more of the starting material introduced into the top thereof. The material removed from the bottom of the reaction vessel can then be immediately introduced into a stage II reaction vessel equipped in the same manner as the first reaction vessel and additionally provided with a high vacuum mechanical pump. It is generally advantageous to conduct the second stage of the reaction as a batch operation although by employing a sufficiently elongated stage II reaction vessel, the process can be conducted continuously by removing the final polycarbonate from the bottom of the stage II reaction vessel after the elapse of sufficient time at the elevated temperature and vacuum, and then continuously introducing more of the partial condensate from the first stage into the top of the stage II reaction vessel. In addition to such a continuous method of preparing these polycarbonates, other methods analogous thereto concerning other polymers (e. g. U. S. 2,647,885) can also be employed.

The bis-(carbonate) monomers employed in accordance with this invention can be prepared by condensing an alkyl (1 to 6 carbon atoms) or an aryl (6 to 8 carbon atoms) carbonate with a polymethylene glycol (4 to 10 carbon atoms) in the presence of an alkaline catalyst, e. g. sodium, potassium methoxide, barium ethoxide, etc. If desired a solvent can be employed such as benzene, toluene, 1,4-dioxane, cyclohexane, pentane, octane, etc. Advantageously the reaction mixture is heated at about 125°–175° C. for about 1 to 3 hours. A reaction vessel equipped with vapor condensing means can be employed to remove the alcohol or the phenol formed by the condensation. If desired, means can be provided to return any solvent to the reaction mixture or else more solvent can be added as may be desired. When the solvent has a low boiling point, the condensation reaction can be carried out under pressure. Agitation can also be provided.

The preparation of the bis-(carbonate) monomers can be further illustrated by the following example:

EXAMPLE A.—HEXAMETHYLENE GLYCOL-BIS-(ETHYL CARBONATE)

Hexamethylene glycol-bis-(ethyl carbonate) was prepared by heating at 140°–160° C. a mixture of 4 gram moles of ethyl carbonate and 1 gram mole of hexamethylene glycol to which a small amount of metallic potassium was added. After 2½ hours about 90% of the theoretical amount of ethyl alcohol had been evolved. After cooling the reaction mixture, benzene was added and resulting solution washed with dilute hydrochloric acid. The benzene layer was then separated and washed with water until neutral. The solution was then dried by azeotropic distillation and the hexamethylene glycol-bis-(ethyl carbonate) isolated by fractionation under reduced pressure. The product distilled at 138°–140° C. at 0.9 mm.

The process can be applied to the preparation of any of the bis-(carbonate) monomers employed in this invention. However, it is generally more advantageous to prepare the monomeric starting materials employing a bromo or chlorocarbonate ester.

The following examples will serve to further illustrate the preparation of the bis-(carbonate) monomers:

EXAMPLE B.—HEXAMETHYLENE GLYCOL-BIS-(ETHYL CARBONATE)

Nine hundred ml. of pyridine and 345 g. (3 moles) of 1,6-hexanediol were placed in a 3 liter flask equipped with a stirrer, a thermometer and a dropping funnel. Ethyl chlorocarbonate (780 g.) (20% excess) was added dropwise while the reaction mixture was stirred. The reaction temperature was maintained at 20–25° C. by external cooling for four hours. The reaction mixture was poured into 4 liters of benzene and washed seven times with water. The benzene layer was separated and dried over calcium sulfate and fractionally distilled. B. P. 130° C. at 0.6 mm. Hg. Yield 785 g. or 82%.

EXAMPLE C.—TETRAMETHYLENE GLYCOL-BIS-(ETHYL CARBONATE)

The procedure described in Example B was repeated employing equivalent quantities of homologous materials. The product was characterized by B. P. 118–121° C./1.5 mm. Hg.

EXAMPLE D.—PENTAMETHYLENE GLYCOL-BIS-(ETHYL CARBONATE)

The procedure described in Example B was repeated employing equivalent quantities of homologous materials. The product was characterized by B. P. 138° C./2.5 mm. Hg.

EXAMPLE E.—DECAMETHYLENE GLYCOL-BIS-(ETHYL CARBONATE)

The procedure described in Example B was repeated employing equivalent quantities of homologous materials. The product was characterized by B. P. 168°–170° C./0.5 mm. Hg.

In the following examples, unless otherwise specified, the catalyst solutions were prepared by dissolving 1 gram of the metal such as sodium in 100 ml. of alcohol such as methanol.

The following examples will serve to further illustrate this invention as it relates to the preparation of the polycarbonate polymers from the bis-(carbonate) monomers:

*Example 1.—Polycarbonate from hexamethylene glycol-bis-(ethyl carbonate)*

One hundred and eleven grams of 1,6-hexanediol-bis-(ethyl carbonate) was mixed with 1 cc. of sodium hydrogen titanium butoxide solution and heated under an atmosphere of nitrogen in a 210° C. bath. This catalyst solution was prepared by dissolving 1 g. of sodium in 99 g. of n-butanol, adding 14.78 g. Ti(OC$_4$H$_9$)$_4$ and diluting to 200 cc. with n-butanol. The diethyl carbonate was removed by distillation through a Vigreux column. After one hour and twenty minutes the reaction flask was equipped with a mechanical stirrer. The flask was evacuated by means of a water pump and the reaction mixture stirred for one-half hour. The water pump was replaced by a mechanical pump and stirring continued for forty minutes. During this period the oil bath was maintained at 245–250° C. The polymer became so viscous that it formed a stiff mass which wrapped around the stirrer. Fibers were drawn from the melted polymer. When cooled to room temperature, these could be cold drawn to form tough fibers. The polymer cooled to form a very tough, white crystalline mass with a melting point of 60° C. and an intrinsic viscosity in chloroform of 0.7.

*Example 2.—Polycarbonate from tetramethylene glycol-bis-(ethyl carbonate)*

Two hundred grams of 1,4-butanediol-bis-(ethyl carbonate) was mixed with 2 cc. of sodium hydrogen titanium butoxide catalyst solution (see Example 1) and heated under an atmosphere of nitrogen in a 240° C. oil bath. The diethyl carbonate was removed through a Vigreux column. After one hour, the reaction flask was evacuated by means of a water pump and the reaction mixture stirred mechanically for ten minutes. The water pump was then replaced by a mechanical pump. Stirring was continued at 250° C. under vacuum of less than 1 mm. Hg for one hour. During the last half hour the polymer wrapped around the stirrer. After cooling the polymer became a tough, rubbery material. A sample dissolved in ethylene chloride precipitated into an ether-ethanol mixture as a fibrous product. A coating from the ethylene chloride solution formed a tough white crystalline film. The material after precipitation in the ether-alcohol solution had a melting point of 60° C. and an instrinsic viscosity in chloroform of above 0.7.

*Example 3.—Polycarbonate from hexamethylene glycol-bis-(ethyl carbonate)*

Fifty grams of 1,6-hexanediol-bis(ethyl carbonate) and 0.6 ml. of LiOCH$_3$ catalyst were stirred under nitrogen and at 240° C. for 40 minutes. A mechanical vacuum pump was attached and the reaction mixture stirred at 240° C. and 0.5 mm. of mercury for one hour. The white tough polyhexamethylene carbonate thus obtained had an intrinsic viscosity of 0.75 ($CHCl_3$). The catalyst was prepared by dissolving 1 g. Li in 100 ml. methanol.

*Example 4.—Polycarbonate from hexamethylene glycol-bis-(ethyl carbonate)*

The procedure described in Example 3 was repeated exactly except that the catalyst consisted of 4 drops of $Ti(OC_4H_9)_4$. A white, tough polymer was obtained which had an intrinsic viscosity of 0.72 in chloroform.

*Example 5.—Polycarbonate from hexamethylene glycol-bis-(ethyl carbonate)*

The procedure described in Example 3 was repeated exactly except that 2 ml. of $NaOCH_3$ was used as the catalyst in lieu of the $LiOCH_3$. The product was a white, tough polymer having an intrinsic viscosity of 1.01 in chloroform.

*Example 6.—Polycarbonate from tetramethylene glycol-bis-(ethyl carbonate)*

Fifty grams of 1.4-butanediol-bis-(ethyl carbonate) and 1 ml. of $NaOCH_3$ catalyst (see Example 3) were stirred under nitrogen for 30 min. at 235° C. oil bath temperature. (The reaction was run in a 200 ml. flask equipped with a mechanical stirrer and a nitrogen inlet tube.) A mechanical vacuum pump was attached, and the nitrogen inlet tube sealed. The reaction mass was stirred for 60 min. at 1 mm. pressure at an oil bath temperature of 240° C. During this time the polymer became very viscous and wrapped around the stirrer. When it cooled to room temperature, it was a very tough, flexible, white polymer.

This product had an intrinsic viscosity of 1.31 in chloroform.

*Example 7.—Polycarbonate from decamethylene glycol-bis-(ethyl carbonate)*

Fifty grams of 1,10-decanediol-bis-(ethyl carbonate) and 1 ml. $NaOCH_3$ were reacted according to procedure in Example 6. First stage at 235° C. for 30 min. Second stage at 240° C. for 60 min. When cooled the polycarbonate crystallized to a white tough material. Threads could be cold drawn to give very tough fibers. This product had an intrinsic viscosity of 1.75 in chloroform.

Other polycarbonates can be similarly prepared from pentamethylene glycol-bis-(n-propyl carbonate), octamethylene glycol-bis-(phenyl carbonate), heptamethylene glycol-bis-(methyl carbonate), etc.

In addition to employing the herein described polymethylene glycol-bis-(alkyl or aryl carbonates) as starting materials for the preparation of polycarbonates having certain valuable properties, the same principles can be applied to the preparation of polycarbonates by the self condensation of other somewhat related compounds such as diethylene glycol-bis-(ethylcarbonate), thiodiglycol-bis-(methylcarbonate), methyldiethanolamine-bis-(propylcarbonate) etc. The products obtained from applying the process of this invention to the polymerization of such starting materials are generally of little practical value since the intrinsic viscosities are low and the products are syrups of generally undesirable color.

The polymeric materials embodying the invention can be produced either batch-wise or in continuous fashion, and the products can be used alone or in admixture with similar or dissimilar polymeric materials. These modified or unmodified polymers can be use for forming fibers, for molding articles, for forming films or sheets.

We claim:

1. A process for preparing a highly polymeric linear polycarbonate comprising (A) self-condensing a bis-(carbonate) monomer having the following formula:

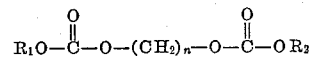

wherein $R_1$ and $R_2$ each represents a radical selected from the group consisting of lower alkyl radicals containing from 1 to 6 carbon atoms and aryl radicals of the benzene series containing from 6 to 8 carbon atoms and $n$ represents a positive integer of from 4 to 10, (B) in the presence of an ester-interchange catalyst, (C) at an elevated temperature, (D) the condensation being conducted in an inert atmosphere, and (E) the latter part of the condensation being conducted at a very low pressure of the adjacent atmosphere.

2. A process as defined in claim 1 wherein the elevated temperature during the course of the condensation is in excess of about 200° C.

3. A process as defined in claim 2 wherein the ester-interchange catalyst is employed in an amount of from about 0.005% to about 0.2% based on the weight of the bis (carbonate) monomer.

4. A process as defined in claim 3 wherein the low pressure is less than about 15 mm. of Hg pressure.

5. A process as defined in claim 4 wherein the bis (carbonate) monomer is tetramethylene glycol-bis-(ethyl carbonate).

6. A process as defined in claim 4 wherein the bis (carbonate) monomer is hexamethylene glycol-bis-(ethyl carbonate).

7. A process as defined in claim 4 wherein the bis (carbonate) monomer is octamethylene glycol-bis-(ethyl carbonate).

8. A process as defined in claim 4 wherein the bis (carbonate) monomer is pentamethylene glycol-bis-(ethyl carbonate).

9. A process as defined in claim 4 wherein the bis (carbonate) monomer is decamethylene glycol-bis-(ethyl carbonate).

References Cited in the file of this patent

UNITED STATES PATENTS 2,210,817   Peterson _____ Aug. 6, 1940